July 21, 1936.  G. H. COLE  2,048,429
STEERING INDICATOR
Filed Dec. 4, 1935  2 Sheets-Sheet 1
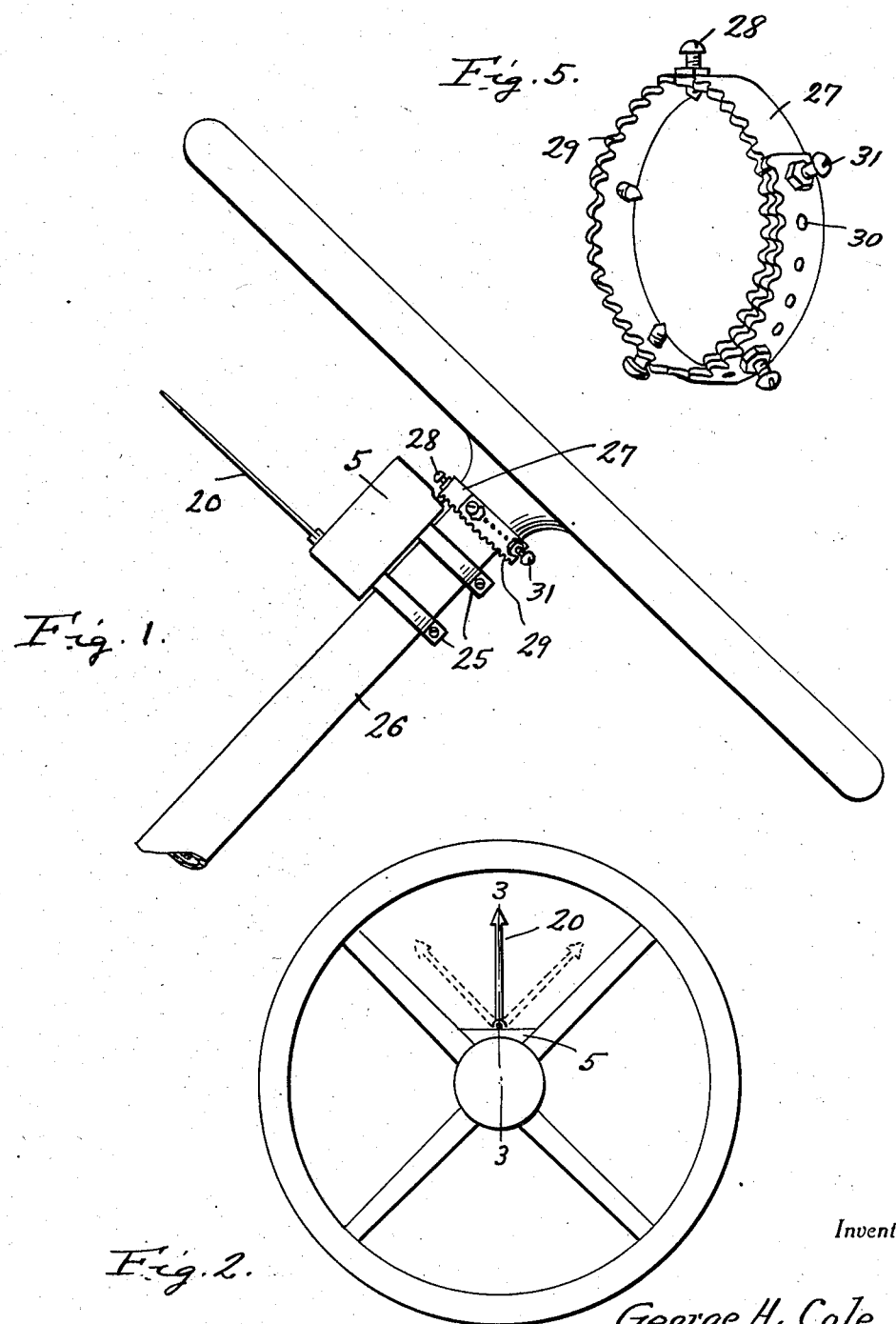
Inventor
George H. Cole
By Clarence A. O'Brien and
Hyman Berman Attorneys July 21, 1936.  G. H. COLE  2,048,429
STEERING INDICATOR
Filed Dec. 4, 1935  2 Sheets-Sheet 2

Inventor
George H. Cole

Patented July 21, 1936

2,048,429

UNITED STATES PATENT OFFICE 2,048,429

STEERING INDICATOR

George H. Cole, Evans City, Pa.

Application December 4, 1935, Serial No. 52,904

1 Claim. (Cl. 116—31)

The present invention relates to an indicating device for use on automobiles so as to indicate the position of the front wheels to the driver.

An important object of the invention resides in the provision of a device of this nature which is simple in construction, inexpensive to manufacture, easy to install, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a fragmentary side elevation showing a steering wheel and a portion of the column thereof with my device mounted thereon.

Figure 2 is a top plan view thereof.

Figure 5 is a perspective view of the collar.

Figure 3:
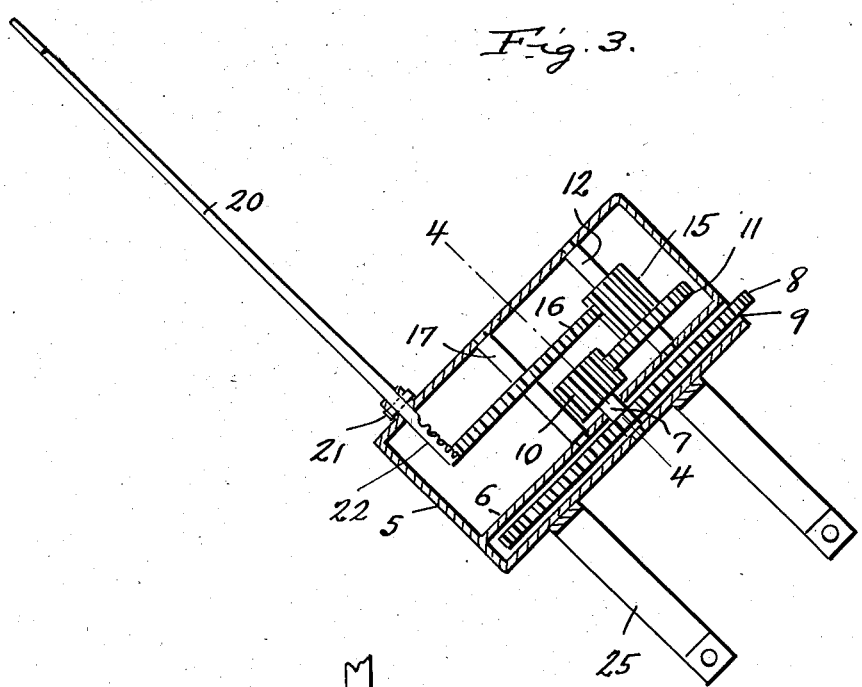
Figure 3 is a sectional view through the device taken substantially on the line 3—3 of Figure 2.
Figure 4:
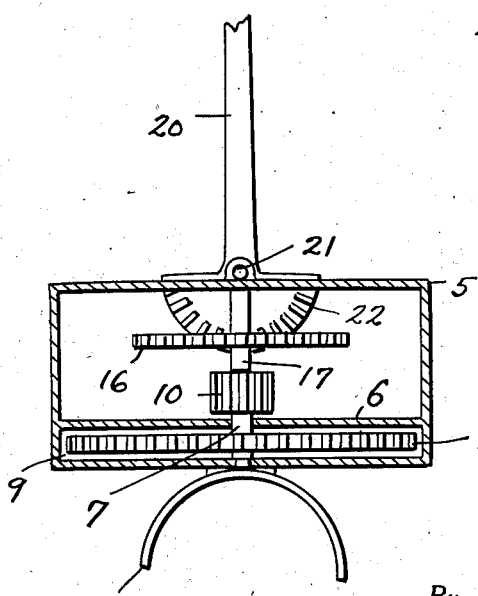
Figure 4 is a sectional view through the device taken substantially on the line 4—4 of Figure 3.

Referring to the drawings in detail it will be seen that the numeral 5 denotes a casing formed with a partition 6 adjacent the bottom thereof. A shaft 7 is journaled through the center of the partition 6 and between the bottom of the casing 5 and the partition has mounted thereon a gear 8 a portion of the periphery of which protrudes beyond a slot 9. On the shaft 7 is a pinion 10 meshing with the gear 11 mounted on a shaft 12 and on which is mounted a pinion 15 meshing with a gear 16 on a shaft 17 journaled between the top of the casing and the partition 6.

Numeral 20 denotes a pointer mounted on the top of the casing to be rockable as indicated at 21 and the lower end thereof is in the form of a segment 22 adjacent the arcuate face of which are provided teeth meshing with the gear 16. A pair of straps 25 are attached to the casing 5 so that it may be disposed on a steering column 26 as shown in Figure 1. Now we come to the important novel features of my invention and it resides in the provision of a band 27 engageable about the steering column 26 by set screws 28 and having series of teeth 29 on one edge thereof engageable or intermeshable with the gear 8. This band has its free ends overlapping with registering openings 30 through which some of the screws 31 are engageable. The said screws 31 are also engageable with other portions of the band so as to position this band about the hub of the steering wheel, as shown in Figure 1, as may be desired, depending upon the size of the steering wheel and the circumstances involved.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantages enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

In combination a steering column and a steering wheel; of a mechanism associated therewith comprising a casing, a partition in said casing dividing said casing into upper and lower sections, one end of the casing adjacent the lower section being provided with a slot therein, a gear wheel pivotally mounted in said lower casing having one end thereof projecting through said slot, an indicator pivotally mounted to said casing and having one end projecting into the upper section, mechanism in the upper section actuated by the gear wheel in the lower section for operating the indicator, a gear secured to the hub of the steering wheel having the teeth thereon meshing with the teeth on the projected portion of the gear extending through the slot.

GEORGE H. COLE.